United States Patent
Sun et al.

(10) Patent No.: US 9,909,481 B2
(45) Date of Patent: *Mar. 6, 2018

(54) SYSTEM AND METHOD FOR DETERMINING TARGET ACTUATOR VALUES OF AN ENGINE USING MODEL PREDICTIVE CONTROL WHILE SATISFYING EMISSIONS AND DRIVABILITY TARGETS AND MAXIMIZING FUEL EFFICIENCY

(71) Applicant: GM Global Technology Operations LLC, Detroit, MI (US)

(72) Inventors: Min Sun, Troy, MI (US); Shifang Li, Shelby Township, MI (US); Francesco Cianflone, Turin (IT); Paolo Nalbone, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/964,680

(22) Filed: Dec. 10, 2015

(65) Prior Publication Data

US 2017/0167347 A1 Jun. 15, 2017

(51) Int. Cl.
*B60T 7/12* (2006.01)
*F01N 9/00* (2006.01)
(Continued)

(52) U.S. Cl.
CPC ........... *F01N 9/005* (2013.01); *F01N 3/2066* (2013.01); *F01N 11/00* (2013.01);
(Continued)

(58) Field of Classification Search
CPC ........... F02D 2021/086; F02D 41/0052; F02D 41/0062; F02D 35/027; F02D 41/005; F02M 25/0709
(Continued)

(56) References Cited

U.S. PATENT DOCUMENTS 6,116,083 A 9/2000 Cullen et al.
7,736,595 B2 6/2010 Gady et al.
(Continued)

OTHER PUBLICATIONS

Wang, Xudong et al. "Estimation of Engine Torque Based on Improved BP Neural Network". 2009 IEEE Article: 978-1-4244-2601-0/09; pp. 1679-1683; 5 Pages.

*Primary Examiner* — John Kwon (57) ABSTRACT

A system according to the present disclosure includes a model predictive control (MPC) module and an actuator module. The MPC module generates a set of possible target values for an actuator of an engine and predicts an operating parameter for the set of possible target values. The predicted operating parameter includes an emission level and/or an operating parameter of an exhaust system. The MPC module determines a cost for the set of possible target values and selects the set of possible target values from multiple sets of possible target values based on the cost. The MPC module determines whether the predicted operating parameter for the selected set satisfies a constraint and sets target values to the possible target values of the selected set when the predicted operating parameter satisfies the constraint. The actuator module controls an actuator of an engine based on at least one of the target values.

20 Claims, 5 Drawing Sheets

(51) Int. Cl.
  *F01N 11/00* (2006.01)
  *F02D 41/26* (2006.01)
  *G05B 13/04* (2006.01)
  *F01N 3/20* (2006.01)
  *F02D 41/14* (2006.01)

(52) U.S. Cl.
  CPC ..... *F02D 41/1406* (2013.01); *F02D 41/1438* (2013.01); *F02D 41/26* (2013.01); *G05B 13/048* (2013.01); *F01N 2900/1602* (2013.01); *F01N 2900/1622* (2013.01); *F02D 41/1461* (2013.01); *F02D 41/1466* (2013.01); *F02D 2041/1412* (2013.01); *F02D 2041/1433* (2013.01); *F02D 2200/025* (2013.01); *F02D 2200/0804* (2013.01)

(58) Field of Classification Search
  USPC ........ 701/101, 103, 108, 109, 110, 111, 114, 701/115; 123/568.11, 568.21, 568.28; 60/274, 275, 295, 297
  See application file for complete search history.

(56) References Cited

U.S. PATENT DOCUMENTS

| | | | |
|---|---|---|---|
| 8,333,062 | B2 | 12/2012 | Sun |
| 9,027,329 | B2 | 5/2015 | Sun |
| 9,133,749 | B2 | 9/2015 | Gady et al. |
| 9,689,778 | B2 | 6/2017 | Sun et al. |
| 2005/0205059 | A1* | 9/2005 | Lewis ................ F02D 13/0207 123/432 |
| 2012/0191427 | A1* | 7/2012 | Cianflone ........... F02D 41/0007 703/2 |
| 2015/0185716 | A1* | 7/2015 | Wichmann ........... F01K 23/101 700/287 |
| 2016/0147204 | A1* | 5/2016 | Wichmann ................ G05F 1/66 700/287 |
| 2016/0258363 | A1* | 9/2016 | Tiwari ..................... F02C 6/18 |
| 2016/0261115 | A1* | 9/2016 | Asati ........................ H02J 3/14 |
| 2017/0167347 | A1* | 6/2017 | Sun ........................ F01N 9/005 |
| 2017/0168466 | A1* | 6/2017 | Sun ...................... G05B 13/026 |

* cited by examiner

SYSTEM AND METHOD FOR DETERMINING TARGET ACTUATOR VALUES OF AN ENGINE USING MODEL PREDICTIVE CONTROL WHILE SATISFYING EMISSIONS AND DRIVABILITY TARGETS AND MAXIMIZING FUEL EFFICIENCY

CROSS-REFERENCE TO RELATED APPLICATIONS

This application is related to U.S. patent application Ser. No. 14/964,726 filed on Dec. 10, 2015. The entire disclosure of the above application is incorporated herein by reference.

FIELD

The present disclosure relates internal combustion engines, and more particularly, to determining target actuator values of an engine using model predictive control while satisfying emissions and drivability targets and maximizing fuel efficiency.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system according to the present disclosure includes a model predictive control (MPC) module and an actuator module. The MPC module generates a set of possible target values for an actuator of an engine and predicts an operating parameter for the set of possible target values. The predicted operating parameter includes an emission level and/or an operating parameter of an exhaust system. The MPC module determines a cost for the set of possible target values and selects the set of possible target values from multiple sets of possible target values based on the cost. The MPC module determines whether the predicted operating parameter for the selected set satisfies a constraint and sets target values to the possible target values of the selected set when the predicted operating parameter satisfies the constraint. The actuator module controls an actuator of an engine based on at least one of the target values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls torque output of an engine. More specifically, the ECM controls actuators of the engine based on target values based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible decreases in fuel consumption. Additionally, calibration and design of the individual SISO controllers may be costly and time consuming.

The ECM of the present disclosure generates the target values using a model predictive control (MPC) module. The MPC module identifies possible sets of target values based on an engine torque request. The MPC module predicts parameters for each of the possible sets based on the possible sets' target values and a mathematical model of the engine.

The MPC module may also determine a cost associated with use of each of the possible sets. The cost determined for a possible set may increase as differences between the target values of the possible set and reference values increase and vice versa. The MPC module may select the possible set that has the lowest cost. Instead of or in addition to identifying possible sets of target values and determining the cost of each of the sets, the MPC module may generate a surface representing the cost of possible sets of target values. The MPC module may then identify the possible set that has the lowest cost based on the slope of the cost surface.

The MPC module may determine whether the predicted parameters of the selected set satisfy constraints. If so, the MPC module may set the target values based on the selected set. Otherwise, the MPC module may select the possible set having the next lowest cost and test that set for satisfaction of the constraints. The process of selecting a set and testing the set for satisfaction of the constraints may be referred to as an iteration. Multiple iterations may be performed during each control loop.

An ECM may generate target actuator values that affect combustion using MPC in the manner described above while separately controlling target actuator values that affect emissions levels and operating parameters of an exhaust system. Some target actuator values that affect combustion also effect emissions levels and exhaust system parameters. Examples of such target actuator values include a target main injection amount and a target throttle area. Other target actuator values, such as a target post injection amount, only affect emissions levels and exhaust system parameters. In either case, separately controlling these target actuator values requires calibration effort to develop relationships between the target actuator values and the emissions levels or exhaust system parameters, and does not optimize the target actuator values.

The ECM of the present disclosure coordinately controls target actuator values that affect combustion and target actuator values that affect emissions levels and exhaust system parameters. The ECM does this by using the MPC module to predict certain parameters, including emissions levels and exhaust system parameters, for a selected set of possible target values. The MPC module then determines whether the predicted parameters satisfy constraints. If so, the MPC modules sets the target values based on the selected set. Otherwise, the MPC module selects the possible set having the next lowest cost and tests that set for satisfaction of the constraints. The MPC module continues in this manner until the MPC module identifies the set of possible target values with the lowest cost that satisfies the constraints. In this way, the ECM uses MPC to optimize target actuator values that affect emissions levels and exhaust system parameters with less calibration effort.

Figure 1:
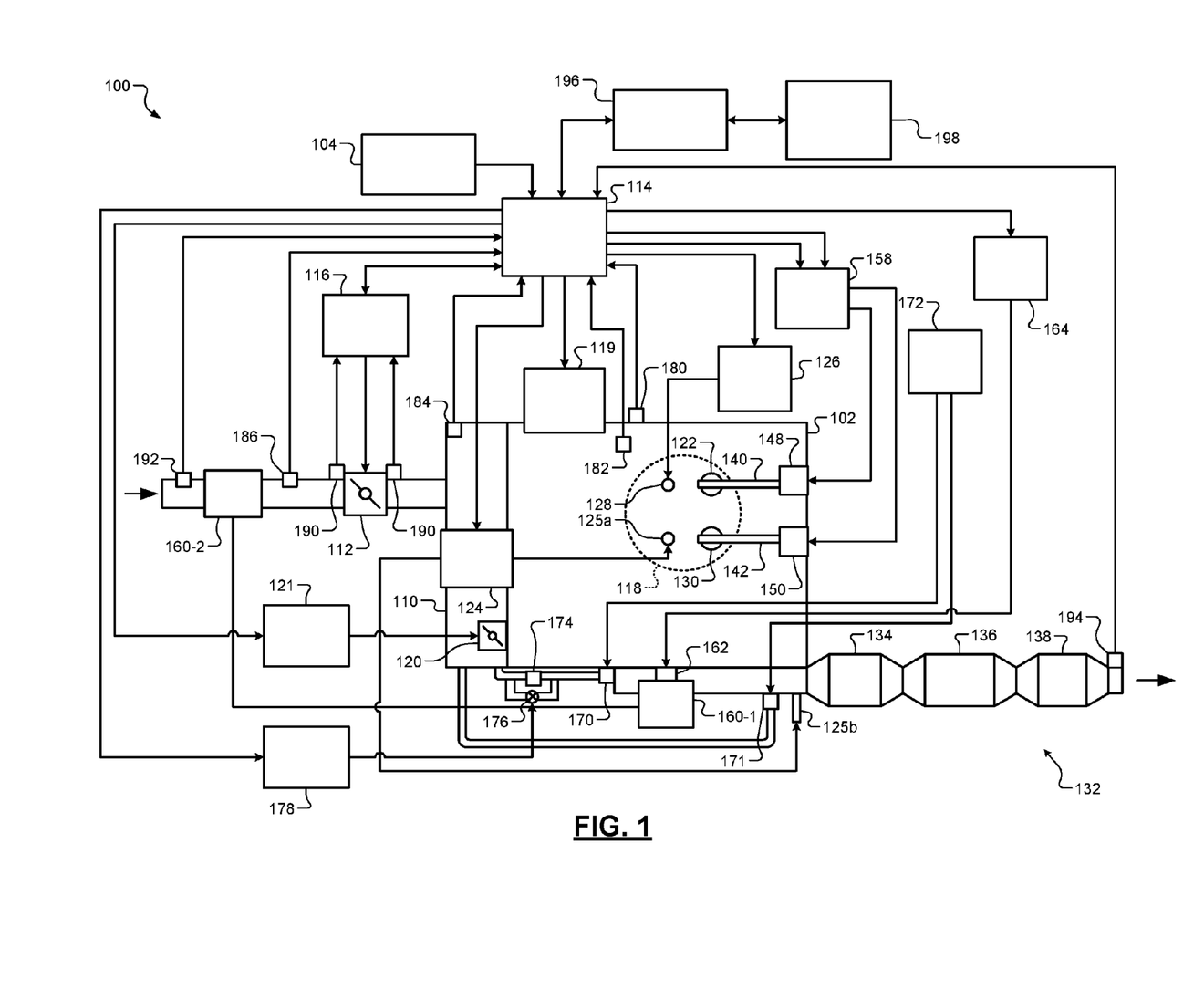
FIG. 1 is a functional block diagram of an example engine system according to the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The engine 102 may be a spark-ignition engine (e.g., a gasoline engine) or a compression-ignition engine (e.g., a diesel engine).

Air is drawn into an intake manifold 110 through a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example, the engine 102 may include 2, 3, 4, 5, 6, 8, 10, and/or 12 cylinders. The ECM 114 may instruct a cylinder actuator module 119 to selectively deactivate some of the cylinders, which may improve fuel economy under certain engine operating conditions.

Air from the intake manifold 110 is drawn into each cylinder of the engine 102 through a swirl flap 120. The swirl flap 120 may include a butterfly valve having a rotatable blade. The swirl flap 120 may be smaller than an intake runner in the intake manifold 110 in which the swirl flap 120 is disposed so that air may flow around the swirl flap 120 when the swirl flap 120 is closed. The ECM 114 controls a swirl actuator module 121, which regulates opening of the swirl flap 120 to control the amount of turbulence in the intake manifold 110. The swirl flap 120 may close the swirl flap 120 when the engine 102 is at an idle speed to create turbulence in the intake manifold 110. As the speed of the engine 102 increases, the swirl actuator module 121 may gradually open the swirl flap 120 until the swirl flap 120 is parallel to the intake airflow.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125a to achieve a target air/fuel ratio. The fuel injector 125a may perform a pilot injection, a main injection, and a post injection. The fuel injector 125a may inject fuel into the intake manifold 110 at a central location or at multiple locations, such as near the intake valve 122 of each of the cylinders. In various implementations, the fuel injector 125a may inject fuel directly into the cylinders or into mixing chambers associated with the cylinders. The fuel actuator module 124 may halt injection of fuel to cylinders that are deactivated. The fuel actuator module 124 also regulates fuel injections performed by a fuel injector 125b. The fuel injector 125b injects fuel into exhaust gas produced by the engine 102. Fuel injections performed by the fuel injector 125b may be referred to as exhaust injections.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 132.

The exhaust system 132 includes a three-way catalyst (TWC) 134, a selective catalytic reduction (SCR) catalyst 136, and a particulate filter (PF) 138. When the air/fuel ratio of the engine 102 is rich or stoichiometric, the TWC 134 reduces hydrocarbon, carbon monoxide, and nitrogen oxide and produces ammonia, and the SCR catalyst 136 stores the ammonia. When the air/fuel ratio is lean, the TWC 134 reduces hydrocarbon and carbon monoxide and the ammonia stored in the SCR catalyst 136 is used to reduce nitrogen oxide.

The exhaust system 132 as described above may be used when if the engine 102 is a spark-ignition engine. If the engine 102 is a compression-ignition engine, the TWC 134 may be omitted from the exhaust system 132. In addition, a dosing system (not shown) may inject a dosing agent such as urea into the exhaust system 132. The dosing agent breaks down to form ammonia that is stored in the SCR catalyst 136.

The PF 138 filters particulate matter, such as soot, from exhaust gas flowing through the exhaust system 132. The ECM 114 may control the fuel injector 125a via the fuel actuator module 124 to perform a post injection in order to regenerate the PF 138. Additionally or alternatively, the ECM 114 may control the fuel injector 125b via the fuel actuator module 124 to inject fuel into the exhaust system 132 in order to regenerate the PF 138.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 119 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 132. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 132. Although shown separated for purposes of illustration, the turbine 160-1 and the compressor 160-2 may be attached to each other, placing intake air in close proximity to hot exhaust.

The engine system 100 may include a high pressure (HP) exhaust gas recirculation (EGR) valve 170 and a low pressure (LP) EGR valve 171, which selectively redirect exhaust gas back to the intake manifold 110. The HP EGR valve 170 may be located upstream of the turbocharger's turbine 160-1. The LP EGR valve 171 may be located downstream of the turbocharger's turbine 160-1. The EGR valves 170 and 171 may be controlled by an EGR actuator module 172 based on signals from the ECM 114.

The engine system 100 may also include an EGR cooler 174 and an EGR cooler bypass valve 176. The EGR cooler 174 may be located downstream of the HP EGR valve 170 and may cool high pressure exhaust gas flowing through the HP EGR valve 170. The EGR cooler bypass valve 176 may allow high pressure exhaust gas to bypass the EGR cooler 174 when the EGR cooler bypass valve 176 is open. The EGR cooler bypass valve 176 may be controlled by a bypass actuator module 178 based on signals from the ECM 114. The ECM 114 may open the EGR cooler bypass valve 176 when the engine 102 is initially started to increase the temperature of the engine 102 and/or components of the exhaust system 132 to their operating temperatures faster.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. A concentration of nitrogen oxide exiting the exhaust system 132 may be measured using a nitrogen oxide (NOx) sensor 194. The ECM 114 may use signals from the sensors to make control decisions for the engine system 100.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114 and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control each of the EGR valves 170 and 171 to achieve a target EGR opening area. The ECM 114 may adjust the target EGR opening area for each of the EGR valves 170 and 171 to achieve a target split between high pressure exhaust gas flowing through the HP EGR valve 170 and low pressure exhaust gas flowing through the LP EGR valve 171. The boost actuator module 164 controls the wastegate 162 to achieve a target wastegate opening area. The cylinder actuator module 119 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
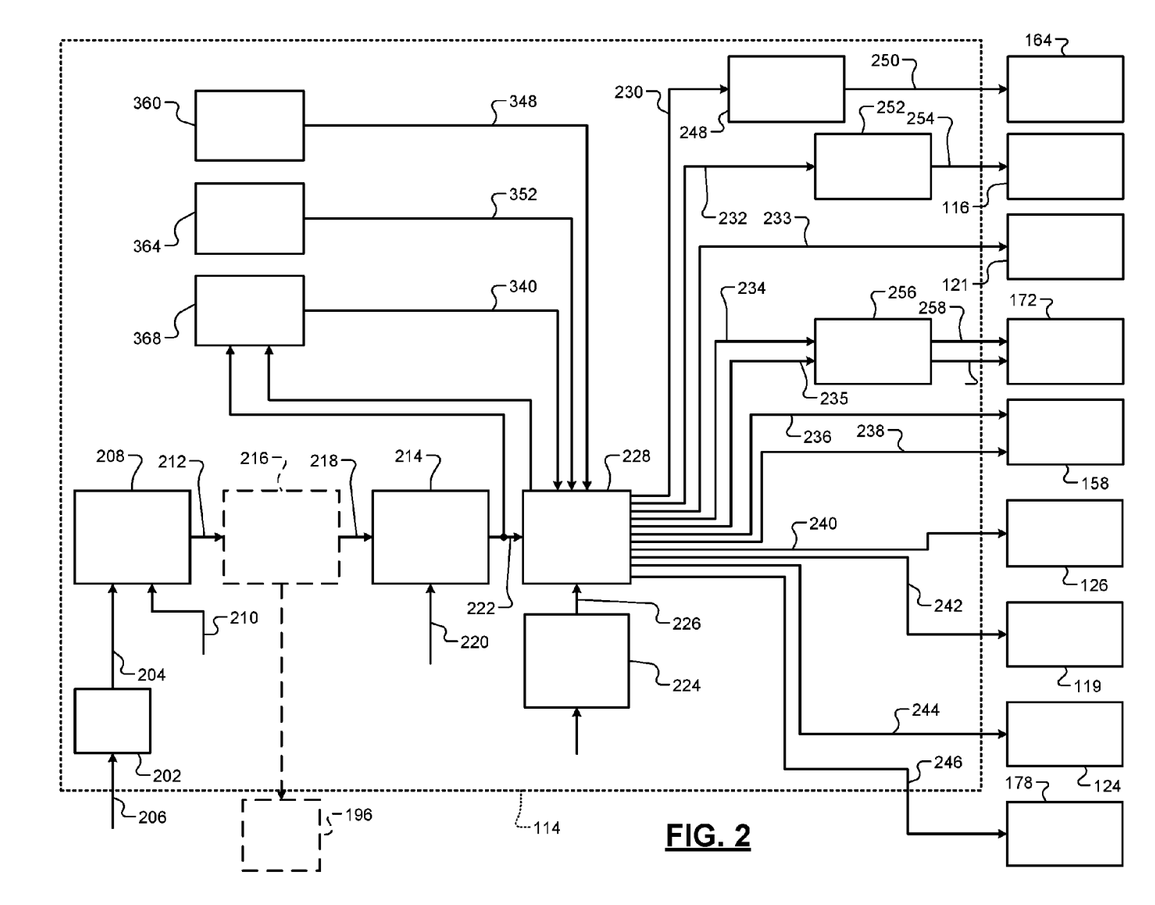
FIG. 2 is a functional block diagram of an example engine control system according to the present disclosure.

Referring now to FIG. 2, an example implementation of the ECM 114 includes a drive torque module 202. The driver torque module 202 determines a driver torque request 204 based on a driver input 206 from the driver input module 104. The driver input 206 may be based on, for example, a position of an accelerator pedal and a position of a brake pedal. The driver input 206 may also be based on cruise control, which may be an adaptive cruise control system that varies vehicle speed to maintain a predetermined following distance. The driver torque module 202 may store one or more mappings of accelerator pedal position to target torque and may determine the driver torque request 204 based on a selected one of the mappings. The driver torque module 202 may also apply one or more filters to rate limit changes in the driver torque request 204.

An axle torque arbitration module 208 arbitrates between the driver torque request 204 and other axle torque requests 210. Axle torque (torque at the wheels) may be produced by various sources including an engine and/or an electric motor. For example, the axle torque requests 210 may include a torque reduction requested by a traction control system when positive wheel slip is detected. Positive wheel slip occurs when axle torque overcomes friction between the wheels and the road surface, and the wheels begin to slip against the road surface. The axle torque requests 210 may also include a torque increase request to counteract negative wheel slip, where a tire of the vehicle slips in the other direction with respect to the road surface because the axle torque is negative.

The axle torque requests 210 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 210 may also be generated by vehicle stability control systems.

The axle torque arbitration module 208 outputs an axle torque request 212 based on the results of arbitrating between the received axle torque requests 204 and 210. As described below, the axle torque request 212 from the axle torque arbitration module 208 may selectively be adjusted by other modules of the ECM 114 before being used to control the engine actuators.

The axle torque arbitration module 208 may output the axle torque request 212 to a propulsion torque arbitration module 214. In various implementations, the axle torque arbitration module 208 may output the axle torque request 212 to a hybrid optimization module 216. The hybrid optimization module 216 may determine how much torque should be produced by the engine 102 and how much torque should be produced by the electric motor 198. The hybrid optimization module 216 then outputs a modified axle torque request 218 to the propulsion torque arbitration module 214.

The propulsion torque arbitration module 214 converts the axle torque request 212 (or the modified axle torque request 218) from an axle torque domain (torque at the wheels) into a propulsion torque domain (torque at the crankshaft). The propulsion torque arbitration module 214 arbitrates between the (converted) axle torque request 212 and other propulsion torque requests 220. The propulsion torque arbitration module 214 generates a propulsion torque request 222 as a result of the arbitration.

For example, the propulsion torque requests 220 may include torque reductions for engine over-speed protection, torque increases for stall prevention, and torque reductions to accommodate transmission gear shifts. The propulsion torque requests 220 may also result from clutch fuel cutoff, which reduces the engine output torque when the driver depresses the clutch pedal in a manual transmission vehicle to prevent a flare in engine speed.

The propulsion torque requests 220 may also include an engine shutoff request, which may be initiated when a critical fault is detected. For example, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 214 may output zero as the propulsion torque request 222.

In various implementations, an engine shutoff request may simply shut down the engine 102 separately from the arbitration process. The propulsion torque arbitration module 214 may still receive the engine shutoff request so that, for example, appropriate data can be fed back to other torque requestors. For example, all other torque requestors may be informed that they have lost arbitration.

A torque reserve module 224 generates a torque reserve 226 to compensate for changes in engine operating conditions that may decrease engine output torque and/or to compensate for one or more loads. For example, the air/fuel ratio of the engine 102 and/or the mass air flow may be directly varied, such as by diagnostic intrusive equivalence ratio testing and/or new engine purging. Before beginning these processes, the torque reserve module 224 may create or increase the torque reserve 226 to quickly offset decreases in engine output torque that result from leaning the air/fuel mixture during these processes.

The torque reserve module 224 may also create or increase the torque reserve 226 in anticipation of a future load, such as power steering pump operation or engagement of an air conditioning (A/C) compressor clutch. The torque reserve module 224 may create or increase the torque reserve 226 for engagement of the A/C compressor clutch when the driver first requests air conditioning. Then, when the A/C compressor clutch engages, the torque reserve module 224 may decrease the torque reserve 226 by an amount equal to the estimated load of the A/C compressor clutch.

A target generating module 228 generates target values for the engine actuators based on the propulsion torque request 222, the torque reserve 226, and other parameters as discussed further below. The target generating module 228 generates the target values using model predictive control (MPC). The propulsion torque request 222 may be a brake torque. Brake torque may refer to torque at the crankshaft under the current operating conditions.

The target values include a target wastegate opening area 230, a target throttle opening area 232, a target swirl flap opening area 233, a target HP EGR opening area 234, a target LP EGR opening area 235, a target intake cam phaser angle 236, and a target exhaust cam phaser angle 238. The target values also include a target spark timing 240, a target number 242 of cylinders to be activated, target fueling parameters 244, and a target bypass opening area 246 for the EGR cooler bypass valve 176. The boost actuator module 164 controls the wastegate 162 to achieve the target wastegate opening area 230. For example, a first conversion module 248 may convert the target wastegate opening area 230 into a target duty cycle 250 to be applied to the wastegate 162, and the boost actuator module 164 may apply a signal to the wastegate 162 based on the target duty cycle 250. In various implementations, the first conversion module 248 may convert the target wastegate opening area 230 into a target wastegate position (not shown), and convert the target wastegate position into the target duty cycle 250.

The throttle actuator module 116 controls the throttle valve 112 to achieve the target throttle opening area 232. For example, a second conversion module 252 may convert the target throttle opening area 232 into a target duty cycle 254 to be applied to the throttle valve 112, and the throttle actuator module 116 may apply a signal to the throttle valve 112 based on the target duty cycle 254. In various implementations, the second conversion module 252 may convert the target throttle opening area 232 into a target throttle position (not shown), and convert the target throttle position into the target duty cycle 254.

The swirl actuator module 121 controls the swirl flap 120 to achieve the target swirl flap opening area 233. In various implementations, a third conversion module (not shown) may be included and may convert the target swirl flap opening area 233 into a target duty cycle (not shown) to be applied to the swirl flap 120. Alternatively, the third conversion module may convert the target swirl flap opening area 233 into a target swirl flap position (not shown), and convert the target swirl flap position into the target duty cycle.

The EGR actuator module 172 controls the HP EGR valve 170 to achieve the target HP EGR opening area 234. For example, a fourth conversion module 256 may convert the target HP EGR opening area 234 into a target duty cycle 258 to be applied to the HP EGR valve 170, and the EGR actuator module 172 may apply a signal to the HP EGR valve 170 based on the target duty cycle 258. In various implementations, the fourth conversion module 256 may convert the target HP EGR opening area 234 into a target EGR position (not shown), and convert the target EGR position into the target duty cycle 258.

The EGR actuator module 172 controls the LP EGR valve 171 to achieve the target LP EGR opening area 235. For example, the fourth conversion module 256 may convert the target LP EGR opening area 235 into a target duty cycle 259 to be applied to the LP EGR valve 171, and the EGR actuator module 172 may apply a signal to the LP EGR valve 171 based on the target duty cycle 259. In various implementations, the fourth conversion module 256 may convert the target LP EGR opening area 235 into a target EGR position (not shown), and convert the target EGR position into the target duty cycle 259.

The phaser actuator module 158 controls the intake cam phaser 148 to achieve the target intake cam phaser angle 236. The phaser actuator module 158 also controls the exhaust cam phaser 150 to achieve the target exhaust cam phaser angle 238. In various implementations, a fifth conversion module (not shown) may be included and may convert the target intake and exhaust cam phaser angles 236 and 238 into target intake and exhaust duty cycles, respectively. The phaser actuator module 158 may apply the target intake and exhaust duty cycles to the intake and exhaust cam phasers 148 and 150, respectively. In various implementations, the target generating module 228 may determine a target valve overlap factor and a target effective displacement, and the phaser actuator module 158 may control the intake and exhaust cam phasers 148 and 150 to achieve the target overlap factor and the target effective displacement.

The target wastegate opening area 230, the target throttle opening area 232, the target swirl flap opening area 233, the target HP EGR opening area 234, the target LP EGR opening area 235, the target intake cam phaser angle 236, and the target exhaust cam phaser angle 238 may be referred to as air control setpoints. The target throttle opening area 232 may only be used as an air control setpoint if the engine 102 is a spark-ignition engine. Thus, if the engine 102 is a compression-ignition engine, the target throttle opening area 232 may not be used as an air control setpoint. Instead, a target EGR flow, a target boost amount, and/or a target engine air flow may be used as air control setpoints. The target EGR flow, the target boost amount, and/or the target engine air flow may be achieved by adjusting the target wastegate opening area 230, a target variable geometry turbocharger (VGT) position (if applicable), the target HP EGR opening area 234, the target LP EGR opening area 235, the target intake cam phaser angle 236, and/or the target exhaust cam phaser angle 238.

The spark actuator module 126 provides spark based on the target spark timing 240. The cylinder actuator module 119 selectively activates and deactivates the valves of cylinders based on the target number of cylinders 242. Fueling and spark may also be disabled to cylinders that are deactivated. The target fueling parameters 244 may include a target fuel rail pressure, a target number of fuel injections for each combustion event, a target mass of fuel for each injection, and/or target start timing for each injection. The fuel actuator module 124 controls fueling based on the target fueling parameters 244. In one example, the fuel actuator module 124 may command a pilot injection, a main injection, a post injection, an exhaust injection, and the target fueling parameters 244 may include a target mass of fuel and target start timing for each of the pilot, main, post, and exhaust injections.

The bypass actuator module 178 controls the EGR cooler bypass valve 176 to achieve the target bypass opening area 246. In various implementations, a sixth conversion module (not shown) may be included and may convert the target bypass opening area 246 into a target duty cycle (not shown) to be applied to the EGR cooler bypass valve 176. Alternatively, the sixth conversion module may convert the target bypass opening area 246 into a target bypass valve position (not shown), and convert the target bypass valve position into the target duty cycle.

Figure 3:
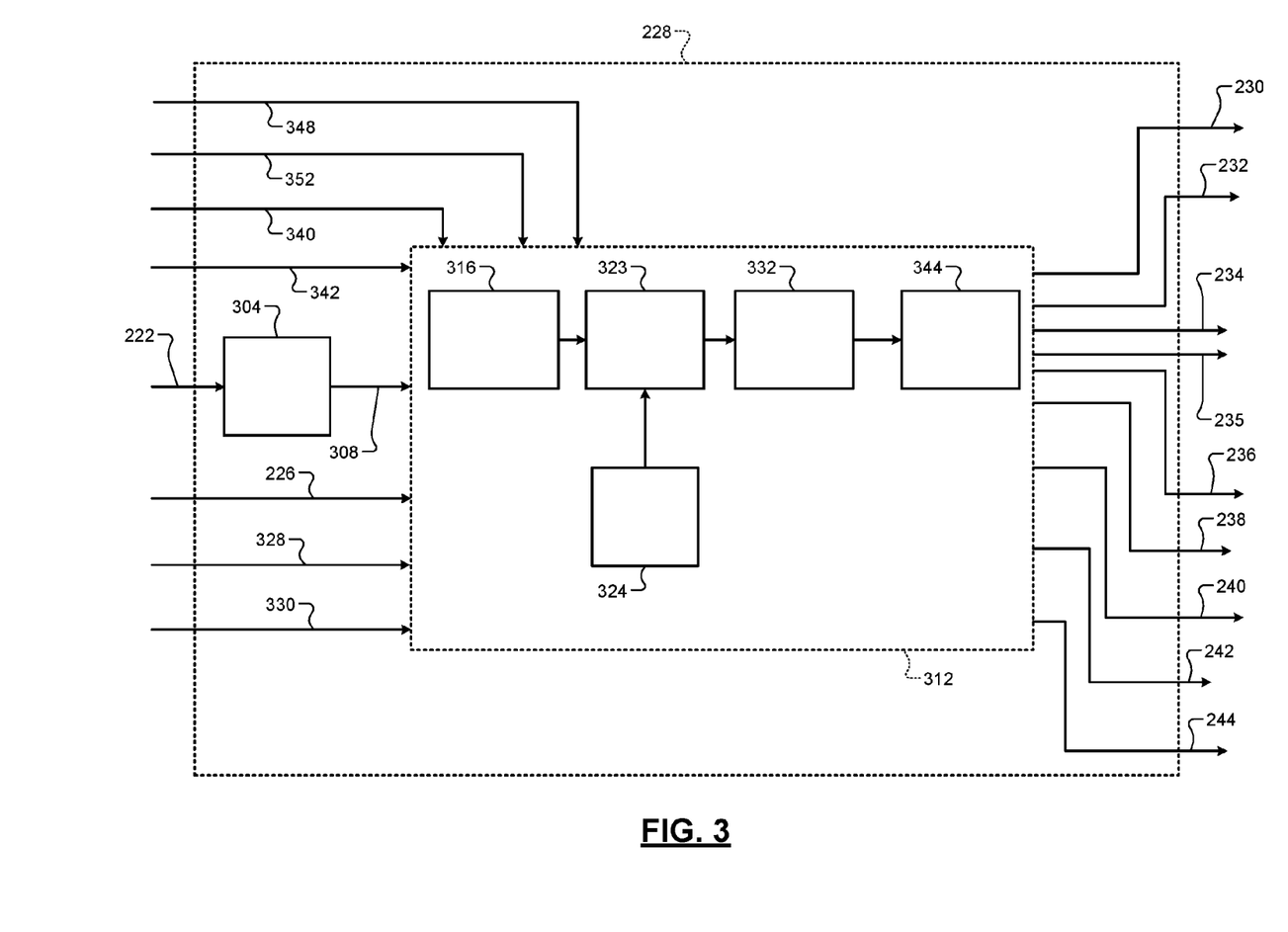
FIG. 3 is a functional block diagram of an example target generating module according to the present disclosure.

FIG. 3 is a functional block diagram of an example implementation of the target generating module 228. Referring now to FIGS. 2 and 3, as discussed above, the propulsion torque request 222 may be a brake torque. A torque conversion module 304 converts the propulsion torque request 222 from brake torque into base torque. The torque request resulting from conversion into base torque will be referred to as a base torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the propulsion torque request 222 into the base torque request 308, for example, using a mapping or a function that relates brake torques to base torques. In various implementations, the torque conversion module 304 may convert the propulsion torque request 222 into another suitable type of torque, such as an indicated torque. An indicated torque may refer to a torque at the crankshaft attributable to work produced via combustion within the cylinders.

An MPC (model predictive control) module 312 generates the target values 230-246 using MPC. The MPC module 312 may be a single module or may comprise multiple modules. For example, the MPC module 312 may include a sequence determination module 316. The sequence determination module 316 determines possible sequences of the target values 230-246 that could be used together during N future control loops. Each of the possible sequences identified by the sequence determination module 316 includes one sequence of N values for each of the target values 230-246. In other words, each possible sequence includes a sequence of N values for the target wastegate opening area 230, a sequence of N values for the target throttle opening area 232, a sequence of N values for the target swirl flap opening area 233, a sequence of N values for the target HP EGR opening area 234, a sequence of N values for the target LP EGR opening area 235, a sequence of N values for the target intake cam phaser angle 236, and a sequence of N values for the target exhaust cam phaser angle 238. Each possible sequence also includes a sequence of N values for the target spark timing 240, the target number of cylinders 242, the target fueling parameters 244, and the target bypass opening area 246. Each of the N values corresponds to one of the N future control loops. N is an integer greater than one.

A prediction module 323 predicts responses of the engine 102 to the possible sequences of the target values 230-246 based on a mathematical model 324 of the engine 102, exogenous inputs 328, and feedback inputs 330. For example, based on a possible sequence of the target values 266-270, the exogenous inputs 328, and the feedback inputs 330, using the model 324, the prediction module 323 may generate a sequence of predicted torques of the engine 102 for the N control loops, a sequence of predicted MAPs for the N control loops, a sequence of predicted APCs for the N control loops, a sequence of predicted amounts of external dilution for the N control loops, a sequence of predicted amounts of internal dilution for the N control loops, a sequence of predicted combustion phasing values for the N control loops, a sequence of predicted combustion quality values for the N control loops, and a sequence of predicted effective displacement values for the N control loops.

The model 324 may include a function or a mapping calibrated based on characteristics of the engine 102. Dilution may refer to an amount of exhaust from a prior combustion event trapped within a cylinder for a combustion event. External dilution may refer to exhaust provided for a combustion event via the EGR valves 170 and 171. Internal dilution (also referred to as residual dilution) may refer to exhaust that remains in a cylinder and/or exhaust that is pushed back into the cylinder following the exhaust stroke of a combustion cycle. Effective displacement may refer to the volume of air drawn into cylinders of an engine as pistons in the cylinders travel from TDC to BDC, minus losses in air volume due to pistons pushing air back into an intake manifold through intake valves of the cylinders.

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5-approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The exogenous inputs 328 may include parameters that are not directly affected by the engine actuators. For example, the exogenous inputs 328 may include engine speed, turbocharger inlet air pressure, IAT, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated internal dilution, an estimated external dilution, MAF, an air/fuel ratio of the engine 102, spark timing, and/or one or more other suitable parameters. The feedback inputs 330 may be measured using sensors (e.g., the IAT sensor 192) and/or estimated based on one or more other parameters.

The prediction module 323 also predicts, for each of the possible sequences of the target values 230-246, levels of emissions in exhaust gas produced by the engine 102, operating parameters of the exhaust system 132, a combustion noise level associated with the engine 102, and/or drivability parameters. The predicted emissions levels may include a level of nitrogen oxide (NOx) in exhaust gas produced by the engine 102, which may be referred to as engine-out NOx. Alternatively or additionally, the predicted emissions levels may include a level of soot in exhaust gas produced by the engine 102, which may be referred to as engine-out soot.

The predicted operating parameters of the exhaust system 132 may include an amount of soot buildup in the PF 138, a level of ammonia stored in the SCR catalyst 136, a temperature of the SCR catalyst 136, and/or a temperature of the PF 138. The amount of soot buildup in the PF 138 may be referred to as PF soot load. The predicted drivability parameters may include the speed of the vehicle and/or the jerk of the vehicle. Vehicle jerk is a second derivative of vehicle speed with respect to time.

The prediction module 323 may predict the emissions levels, the exhaust system operating parameters, the combustion noise level, and the drivability parameters based on, for example, the exogenous inputs 328 and/or the feedback inputs 330. The prediction module 323 may make these predictions using linear or nonlinear physics-based models. For example, based on a possible sequence of the target values 266-270, the exogenous inputs 328, and the feedback inputs 330, using the physics-based models, the prediction module 323 may generate a sequence of predicted engine-out NOx levels for the N control loops, a sequence of predicted engine-out soot levels for the N control loops, a sequence of predicted PF soot load for the N control loops, a sequence of predicted ammonia storage levels for the N control loops, a sequence of predicted SCR temperatures for the N control loops, a sequence of predicted PF temperatures for the N control loops, a sequence of predicted combustion noise levels for the N control loops, a sequence of predicted vehicle speeds for the N control loops, and a sequence of predicted vehicle jerks for the N control loops.

The physics-based models used by the prediction module 323 to predict the emissions levels, the exhaust system operating parameters, the combustion noise level, and the drivability parameters may be artificial neural networks (e.g., data-driven models). For example, the models may include a non-linear weighted sum such as that included in the following relationship:

$$f(x) = K(\Sigma_{i=1}^{N} w_i g_i(x)),$$

where f(x) is a neuron's network function for a predicted parameter, K is a predetermined function such as a hyperbolic tangent, $w_i$ is a weighting value, and $g_i(x)$ is a collection of other functions. K is commonly referred to as an activation function, and $g_i(x)$ may be expressed as a vector such as: $g(x)=(g_1, g_2, \ldots, g_N)$.

A cost module 332 determines a cost value for each of the possible sequences of the target values 230-246 based on the predicted parameters determined for a possible sequence and may determine the cost value based on reference values 340. The cost module 332 may determine the cost value for each of the possible sequences based on relationships between the predicted parameters and corresponding ones of the reference values 340. The relationships may be weighted, for example, to control the effect that each of the relationships has on the cost.

A selection module 344 selects one of the possible sequences of the target values 230-246 based on the respective costs of the possible sequences. For example, the selection module 344 may select the one of the possible sequences having the lowest cost while satisfying actuator constraints 348 and output constraints 352.

In various implementations, satisfaction of the actuator constraints 348 and/or the output constraints 352 may be considered in the cost determination. For example, the cost module 332 may determine the cost value for each of the possible sequences based on relationships between the predicted parameters and corresponding ones of the actuator constraints 348 and the output constraints 352.

The selection module 344 may set the target values 230-246 to the first ones of the N values of the selected possible sequence, respectively. In other words, the selection module 344 sets the target wastegate opening area 230 to the first one of the N values in the sequence of N values for the target wastegate opening area 230, set the target throttle opening area 232 to the first one of the N values in the sequence of N values for the target throttle opening area 232, set the target swirl flap opening area 233 to the first one of the N values in the sequence of N values for the target swirl flap opening area 233, set the target HP EGR opening area 234 to the first one of the N values in the sequence of N values for the target HP EGR opening area 234, set the target LP EGR opening area 235 to the first one of the N values in the sequence of N values for the target LP EGR opening area 235, set the target intake cam phaser angle 236 to the first one of the N values in the sequence of N values for the target intake cam phaser angle 236, and set the target exhaust cam phaser angle 238 to the first one of the N values in the sequence of N values for the target exhaust cam phaser angle 238. The selection module 344 also sets the target spark timing 240 to the first one of the N values in the sequence of N values for the target spark timing 240, the target number of cylinders 242 to the first one of the N values in the sequence of N values for the target number of cylinders 242, the target fueling parameters 244 to the first one of the N values in the sequence of N values for the target fueling parameters 244, and the target bypass opening area 246 to the first one of the N values in the sequence of N values for the target bypass opening area 246.

During a next control loop, the MPC module 312 identifies possible sequences, generates the predicted parameters for the possible sequences, determines the cost of each of the possible sequences, selects of one of the possible sequences, and sets of the target values 230-246 to the first set of the target values 230-246 in the selected possible sequence. This process continues for each control loop.

An actuator constraint module 360 (see FIG. 2) sets the actuator constraints 348 for each of the target values 230-246. In other words, the actuator constraint module 360 sets actuator constraints for the throttle valve 112, actuator constraints for the EGR valves 170 and 171, actuator constraints for the wastegate 162, actuator constraints for the intake cam phaser 148, and actuator constraints for the exhaust cam phaser 150. The actuator constraint module 360 also sets actuator constraints for the spark actuator module 126, actuator constraints for the cylinder actuator module 119, and actuator constraints for the fuel actuator module 124.

The actuator constraints 348 for each of the target values 230-246 may include a maximum value for an associated target value and a minimum value for that target value. The actuator constraint module 360 may generally set the actuator constraints 348 to predetermined operational ranges for the associated engine actuators. More specifically, the actuator constraint module 360 may generally set the actuator constraints 348 to predetermined operational ranges for the throttle valve 112, the EGR valves 170 and 171, the wastegate 162, the intake cam phaser 148, the exhaust cam phaser 150, the spark actuator module 126, the cylinder actuator module 119, and the fuel actuator module 124, respectively. Thus, the maximum value for a target value may be a maximum limit of a corresponding actuator and the minimum value for the target value may be a minimum limit of that actuator.

An output constraint module 364 (see FIG. 2) sets the output constraints 352 for the predicted torque output of the engine 102, the predicted MAP, the predicted APC, the predicted CA50, the predicted COV of IMEP, the predicted internal dilution, the predicted external dilution, and/or the predicted effective displacement. The output constraints 352 for each of the predicted parameters may include a maximum value for an associated predicted parameter and a minimum value for that predicted parameter. For example, the output constraints 352 may include a minimum torque, a maximum torque, a minimum MAP, a maximum MAP, a minimum APC, a maximum APC, a minimum CA50, a maximum CA50, a minimum COV of IMEP, a maximum COV of IMEP, a minimum internal dilution, a maximum internal dilution, and a minimum external dilution, a maximum external dilution, a minimum effective displacement, and/or a maximum effective displacement.

The output constraint module 364 may generally set the output constraints 352 to predetermined ranges for the associated predicted parameters, respectively. However, the output constraint module 364 may vary one or more of the output constraints 352 under some circumstances. For example, the output constraint module 364 may retard the maximum CA50, such as when knock occurs within the engine 102. In another example, the output constraint module 364 may increase the maximum COV of IMEP under low load conditions, such as during engine idling where a higher COV of IMEP may be needed to achieve a given torque request.

A reference value module 368 (see FIG. 2) generates the reference values 340 for the target values 230-246. The reference values 340 include a reference for each of the target values 230-246. In other words, the reference values 340 include a reference wastegate opening area, a reference throttle opening area, a reference EGR opening area, a reference intake cam phaser angle, and a reference exhaust cam phaser angle. The reference values 340 also include reference spark timing, a reference number of cylinders, and reference fueling parameters. The reference values 340 may also include a reference for each of the output constraints 352. For example, the reference values 340 may include a reference manifold absolute pressure (MAP), a reference mass of air per cylinder (APC), a reference external dilution, a reference internal dilution, and a reference effective displacement.

The reference value module 368 may determine the reference values 340 based on the propulsion torque request 222 and/or the base torque request 308. The reference values 340 provide references for setting the target values 266-270. The reference values 340 may be used to determine the cost values for possible sequences, as discussed further below. The reference values 340 may also be used for one or more other reasons, such as by the sequence determination module 316 to determine possible sequences.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 230-246 using a quadratic programming (QP) solver, such as a Dantzig QP solver. In another example, the MPC module 312 may generate a surface of cost values for the possible sequences of the target values 230-246 and, based on the slope of the cost surface, identify a sequence of possible target values having the lowest cost. The MPC module 312 may then test that sequence of possible target values to determine whether that sequence of possible target values satisfies the actuator constraints 348 and the output constraints 352. If so, the MPC module 312 may set the target values 230-246 to the first ones of the N values of that selected possible sequence, respectively, as discussed above.

If the actuator constraints 348 or the output constraints 352 are not satisfied, the MPC module 312 selects another sequence of possible target values with a next lowest cost and tests that sequence of possible target values for satisfaction of the actuator constraints 348 and the output constraints 352. The process of selecting a sequence and testing the sequence for satisfaction of the actuator constraints 348 and the output constraints 352 may be referred to as an iteration. Multiple iterations may be performed during each control loop.

The MPC module 312 performs iterations until a sequence with the lowest cost that satisfies the actuator constraints 348 and the output constraints 352 is identified. In this manner, the MPC module 312 selects the sequence of possible target values having the lowest cost while satisfying the actuator constraints 348 and the output constraints 352. If a sequence cannot be identified, the MPC module 312 may indicate that no solution is available.

The cost module 332 may determine the cost for the possible sequences of the target values 230-246 based on a total amount of fuel injected into cylinders of the engine 102 and the exhaust system 132, as well as the combustion noise level of the engine 102. For example, the cost module 332 may determine the cost for a possible sequence of the target values 230-246 based on the following equation:

$$\text{Cost} = \sum_{i=1}^{N} [PFi + wCN \cdot PCNi],$$

subject to the actuator constraints 348 and the output constraints 352. Cost is the cost for the possible sequence of the target values 230-246, PFi is a possible total fueling amount for the i-th one of the N control loops, PCNi is the predicted combustion noise level for the i-th one of the N control loops, and wCN is a weighting value associated with the predicted combustion noise level. The possible total fueling amount PFi may include a total amount of fuel to be injected during a pilot injection, a main injection, a post injection and an exhaust injection for the i-th one of the N control loops. In various implementations, the predicted combustion noise level and the weighting value associated therewith may be omitted from the above equation, and the predicted combustion noise level may instead be subject to a corresponding one of the output constraints 352.

When the cost module 332 uses the above equation to determine the cost, selection of the possible sequence of the target values 230-246 with the lowest cost may be subject to those of the output constraints 352 that relate to emissions levels, exhaust system parameters, and drivability parameters. For example, the output constraints 352 may include a maximum engine-out NOx level, a maximum engine-out soot level, a maximum PF soot load, a maximum ammonia storage level, a maximum SCR temperature, a maximum PF temperature, a maximum combustion noise level, a minimum vehicle speed, a maximum vehicle speed, a minimum vehicle jerk and a maximum vehicle jerk. The possible sequence of the target values 230-246 may satisfy the output constraints 352 when the corresponding predicted parameters are less than maximum ones of the output constraints and greater than minimum ones of the output constraints 352. More specifically, the possible sequence of the target values 230-246 may satisfy the output constraints 352 when the predicted engine-out NOx level is less than the maximum engine-out NOx level, the predicted engine-out soot level is less than the maximum engine-out soot level, the predicted PF load is less than the maximum PF soot load, the predicted ammonia storage level is less than the maximum ammonia storage level, the predicted SCR temperature is less than the maximum SCR temperature, the predicted PF temperature is less than the maximum PF temperature, the predicted combustion noise level is less than the maximum combustion noise level, the predicted vehicle speed is greater than the minimum vehicle speed and less than the maximum vehicle speed, and the predicted vehicle jerk is greater than the minimum vehicle jerk and less than the maximum vehicle jerk.

In various implementations, satisfaction of the output constraints 352 that relate to emissions levels, exhaust system parameters, and drivability parameters may be considered in the cost determination. For example, the cost module 332 may determine the cost value for each of the possible sequences of the target values 230-246 based on relationships between the predicted parameters and corresponding ones of the output constraints 352 discussed above. More specifically, the cost module 332 may determine the cost value for each of the possible sequences of the target values 230-246 based on relationships between: the predicted engine-out NOx and the maximum engine out NOX; the predicted engine-out soot and the maximum engine-out soot; the predicted ammonia storage level and the maximum ammonia storage level; the predicted SCR temperature and the maximum SCR temperature; the predicted PF temperature and the maximum PF temperature; the predicted combustion noise level and the maximum combustion noise level; the predicted vehicle speed and the minimum and maximum vehicle speeds; and the predicted vehicle jerk and the minimum and maximum vehicle jerks.

Figure 4:
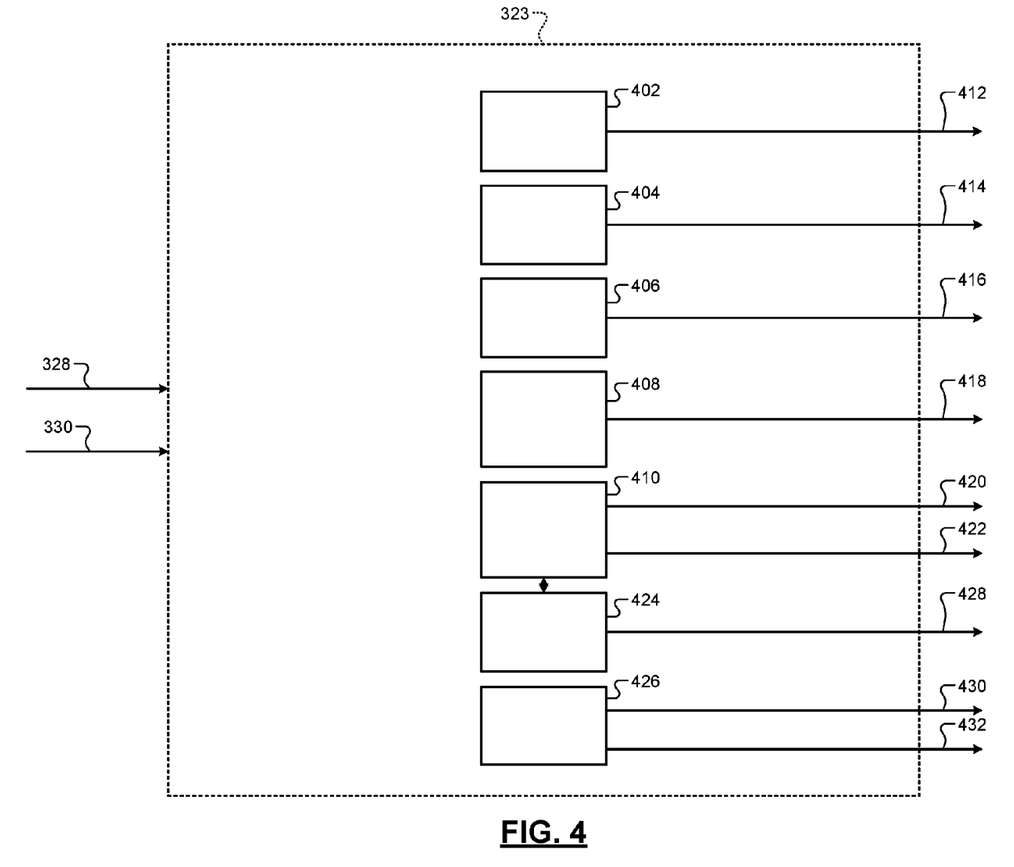
FIG. 4 is a functional block diagram of an example prediction module according to the present disclosure.

Referring now to FIG. 4, an example implementation of the prediction module 323 includes an engine-out NOx module 402, an engine-out soot module 404, a PF soot load module 406, an SCR ammonia storage module 408, and an SCR/PF Temperature module 410. The engine-out NOx module 402 predicts a level of nitrogen oxide (NOx) in exhaust gas produced by the engine 102 which, as noted above, may be referred to as engine-out NOx. The engine-out NOx module 402 outputs a signal 412 indicating the predicted engine-out NOx level.

The engine-out NOx module 402 may predict the engine-out NOx level based on various engine parameters. These parameters may include a rate of air flow into cylinders of the engine 102, an oxygen concentration in the intake manifold 110, fuel injection timing and pressure, pilot injection quantity and timing, and a temperature in the intake manifold 110, the engine coolant temperature, and/or the position of the swirl flap 120. The engine-out NOx module 402 may predict the engine-out NOx level using a model, an equation, and/or a lookup table that relates one or more of the aforementioned parameters to the engine-out NOx level.

The engine-out soot module 404 predicts a level of soot in exhaust gas produced by the engine 102 which, as noted above, may be referred to as engine-out soot. The engine-out soot module 404 outputs a signal 414 indicating the predicted engine-out soot level. The engine-out soot module 404 may predict the engine-out soot level based on various engine parameters. These parameters may include the air/fuel ratio of the engine 102, the total amount of recirculated exhaust gas provided to the engine 102, and/or fuel injection timing and pressure. The engine-out soot module 404 may predict the engine-out soot level using a model, an equation, and/or a lookup table that relates one or more of the aforementioned parameters to the engine-out soot level.

The PF soot load module 406 predicts an amount of soot buildup in the PF 138, which may be referred to as PF soot load. The PF soot load module 406 outputs a signal 416 indicating the predicted PF soot load. The PF soot load module 406 may predict the PF soot load based on various parameters. These parameters may include the flow rate of engine-out NOx, the filtration efficiency of the PF 138, and the rates of reactions that take place within the PF 138, such as the following two reactions:

$$C+O_2=CO_2; \text{ and} \quad (1)$$

$$C+2NO_2=CO_2+2NO. \quad (2)$$

The PF soot load module 406 may predict the PF soot load using a model, an equation, and/or a lookup table that relates one or more of the aforementioned parameters to the engine-out soot level.

The SCR ammonia storage module 408 predicts a level of ammonia stored in the SCR catalyst 136. The SCR ammonia storage module 408 outputs a signal 418 indicating the predicted ammonia storage level. The SCR ammonia storage module 408 may predict the engine-out soot level based on various parameters. These parameters may include a level of oxygen in exhaust gas entering the SCR catalyst 136, a level of NOx in exhaust gas entering the SCR catalyst 136, a mass flow rate of exhaust gas entering the SCR catalyst 136, a temperature of exhaust gas entering the SCR catalyst 136, and/or a temperature of a substrate in the SCR catalyst 136. The SCR ammonia storage module 408 may predict the ammonia storage level using a model, an equation, and/or a lookup table that relates one or more of the aforementioned parameters to the ammonia storage level.

The SCR/PF temperature module 410 predicts the temperature of the SCR catalyst 136 and the temperature of the PF 138. The SCR/PF temperature module 410 outputs a signal 420 indicating the predicted SCR temperature and a signal 422 indicating the predicted PF temperature. The SCR/PF temperature module 410 may predict the SCR and PF temperatures based on various parameters. These parameters may include the temperature of exhaust gas entering the SCR catalyst 136, the mass flow rate of exhaust gas entering the SCR catalyst 136, the specific heat of exhaust gas, the masses of substrates in the SCR catalyst 136 and the PF 138, and the specific heats of those substrates. The SCR/PF temperature module 410 may predict the SCR and PF temperatures using a model, an equation, and/or a lookup table that relates one or more of the aforementioned parameters to the SCR and PF temperatures.

The example implementation of the prediction module 323 shown in FIG. 4 further includes a combustion noise module 424 and a drivability module 426. The combustion noise module 424 predicts a level of noise due to combustion of the air/fuel mixture provided to cylinders of the engine 102. The combustion noise module 424 outputs a signal 428 indicating the predicted combustion noise level. The combustion noise module 424 may predict the combustion noise level based on various engine parameters. These parameters may include engine speed, the mass flow rate of intake air, the fuel injection timing, the number of fuel injections per combustion event, and/or the amount of fuel injected during each injection. The engine-out soot module 404 may predict the combustion noise level using a model, an equation, and/or a lookup table that relates one or more of the aforementioned parameters to the engine-out soot level.

The drivability module 426 predicts drivability parameters including the speed of the vehicle and the jerk of the vehicle. The drivability module 426 outputs a signal 430 indicating the predicted vehicle speed and a signal 432 indicating the predicted vehicle jerk. The drivability module 426 may also predict the amount of torque produced by the engine 102 and output a signal (not shown) indicating the predicted torque output of the engine 102. The drivability module 426 may predict the vehicle speed and the vehicle jerk based on various engine parameters. These parameters may include current vehicle speed, engine speed, the mass flow rate of intake air, the fuel injection timing, the number of fuel injections per combustion event, and/or the amount of fuel injected during each injection. The engine-out soot module 404 may predict the vehicle speed and the vehicle jerk using a model, an equation, and/or a lookup table that relates one or more of the aforementioned parameters to the vehicle speed and the vehicle jerk.

The parameters used to predict the engine-out NOx level, the engine-out soot level, the PF soot load, the ammonia storage level, the SCR temperature, the PF temperature, the combustion noise level, the vehicle speed, and the vehicle jerk may be included in the exogenous inputs 328 and/or the feedback inputs 330. Alternatively, these parameters may be included in the responses of the engine 102 that are predicted based on the possible sequences of the target values 230-246, the exogenous inputs 328, and the feedback inputs 330 using the model 324.

Figure 5:
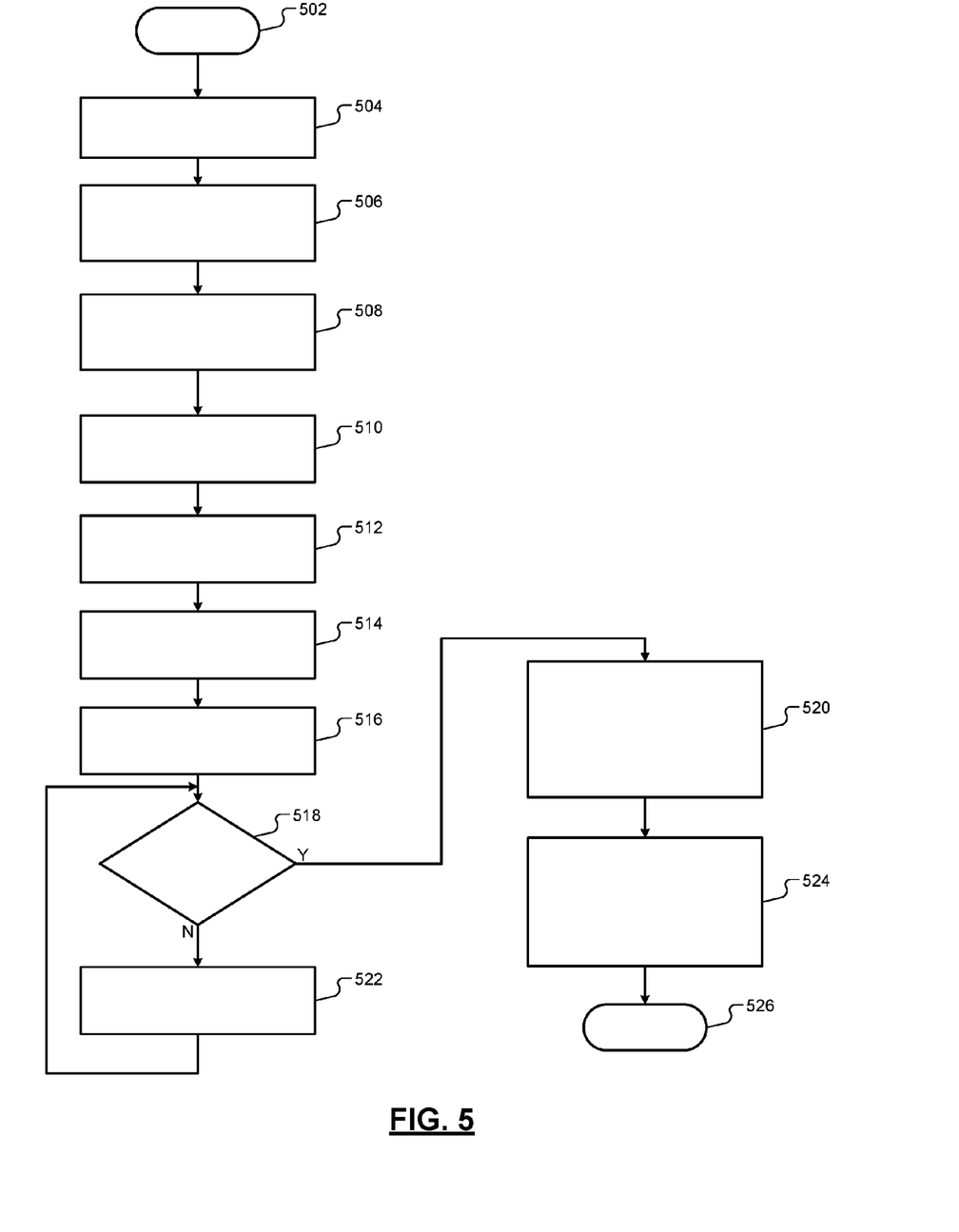
FIG. 5 is a flowchart depicting an example method of controlling a throttle valve, a swirl flap, intake and exhaust valve phasing, a wastegate, an exhaust gas recirculation (EGR) valve, an EGR cooler bypass valve, spark timing, and fueling using model predictive control according to the present disclosure.

Referring now to FIG. 5, an example method of controlling the throttle valve 112, the swirl flap 120, the intake cam phaser 148, the exhaust cam phaser 150, the wastegate 162 (and therefore the turbocharger), the EGR valves 170 and 171, the EGR cooler bypass valve 176, spark timing, fueling, and number of cylinders activated/deactivated using MPC (model predictive control) begins at 502. At 504, the propulsion torque arbitration module 214 determines the propulsion torque request 222. At 506, the torque conversion module 304 converts the propulsion torque request 222 into the base torque request 308 or into another suitable type of torque for use by the MPC module 312.

At 508, the reference value module 368 determines the reference values 340. As discussed above, the setpoint module 368 may determine the reference values 340 based on the propulsion torque request 222 and/or the base torque request 308. At 510, the sequence determination module 316 determines possible sequences of the target values 230-246.

At 512, the prediction module 323 predicts parameters for each of the possible sequences of the target values 230-246. For example, the prediction module 323 may use nonlinear or liner physics-based models, such as artificial neural networks, to predict the emissions levels, the exhaust system parameters, the combustion noise levels, and the drivability parameters. More specifically, based on a possible sequence of the target values 266-270, the exogenous inputs 328, and the feedback inputs 330, using the physics-based models, the prediction module 323 may generate a sequence of predicted engine-out NOx levels for the N control loops, a sequence of predicted engine-out soot levels for the N control loops, a sequence of predicted PF soot load for the N control loops, a sequence of predicted ammonia storage levels for the N control loops, a sequence of predicted SCR temperatures for the N control loops, a sequence of predicted PF temperatures for the N control loops, a sequence of predicted combustion noise levels for the N control loops, a sequence of predicted vehicle speeds for the N control loops, and a sequence of predicted vehicle jerks for the N control loops.

At 514, the cost module 332 determines the costs for the possible sequences of the target values 230-246. For example, the cost module 332 may determine the cost for a possible sequence of the target values 230-246 based on the equation:

$$\text{Cost} = \Sigma_{i=1}^{N}[PFi + wCN \cdot PCNi],$$

subject to the actuator constraints 348 and/or the output constraints 352, as discussed above.

At 516, the selection module 344 selects one of the possible sequences of the target values 230-246 based on the costs of the possible sequences. For example, the selection module 344 may select the one of the possible sequences having the lowest cost. The selection module 344 may therefore select the one of the possible sequences that best achieves the base torque request 308 while satisfying emissions and drivability targets and maximizing fuel efficiency. Instead of or in addition to determining possible sequences of the target values 230-246 at 510 and determining the cost of each of the sequences at 514, the MPC module 312 may identify a sequence of possible target values having the lowest cost using convex optimization techniques as discussed above.

At 518, the MPC module 312 determines whether the selected one of the possible sequences satisfies the actuator constraints 348 and the output constraints 352. If the selected one of the possible sequences satisfies the actuator constraints 348 and the output constraints 352, the method continues at 520. Otherwise, the method continues at 522, where the MPC module 312 selects the one of the possible sequences with the next lowest cost. The method then returns to 518. In this manner, the sequence with the lowest cost that satisfies the actuator constraints 348 and the output constraints 352 is used.

At 520, the first conversion module 248 converts the target wastegate opening area 230 into the target duty cycle 250 to be applied to the wastegate 162, the second conversion module 252 converts the target throttle opening area 232 into the target duty cycle 254 to be applied to the throttle valve 112. Also, at 520, the fourth conversion module 256 converts the target HP EGR opening area 234 into the target duty cycle 258 to be applied to the HP EGR valve 170. Further, at 520, the fourth conversion module 256 converts the target LP EGR opening area 235 into the target duty cycle 259 to be applied to the LP EGR valve 171. The fifth conversion module may also convert the target intake and exhaust cam phaser angles 236 and 238 into the target intake and exhaust duty cycles to be applied to the intake and exhaust cam phasers 148 and 150, respectively.

At 524, the throttle actuator module 116 controls the throttle valve 112 to achieve the target throttle opening area 232. For example, the throttle actuator module 116 may apply a signal to the throttle valve 112 at the target duty cycle 254 to achieve the target throttle opening area 232. Also at 524, the swirl actuator module 121 controls the swirl flap 120 to achieve the target swirl flap opening area 233, and the phaser actuator module 158 controls the intake and exhaust cam phasers 148 and 150 to achieve the target intake and exhaust cam phaser angles 236 and 238, respectively Also at 524, the EGR actuator module 172 controls the EGR valves 170 and 171 to achieve the target HP and LP EGR opening areas 234 and 235, respectively, and the boost actuator module 164 controls the wastegate 162 to achieve the target wastegate opening area 230. For example, the EGR actuator module 172 may apply signals to the EGR valves 170 and 171 at the target duty cycles 258 and 259, respectively, to achieve the target EGR opening areas 234 and 235, respectively, and the boost actuator module 164 may apply a signal to the wastegate 162 at the target duty cycle 250 to achieve the target wastegate opening area 230. Also at 524, the spark actuator module 126 controls the spark timing based on the target spark timing 240, the cylinder actuator module 119 controls cylinder activation and deactivation based on the target number of cylinders 242, and the fuel actuator module 124 controls fueling based on the target fueling parameters 244. Also at 524, the bypass actuator module 178 controls the EGR cooler bypass valve 176 to achieve the target bypass opening area 246. At 526, the method may end. Alternatively, FIG. 5 may illustrate one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a model predictive control (MPC) module that:
        generates a set of possible target values for an actuator of an engine;
        predicts an operating parameter for the set of possible target values, wherein the predicted operating parameter includes at least one of an emission level and an operating parameter of an exhaust system;
        determines a cost for the set of possible target values, wherein the cost is a value that represents a loss of engine performance;
        selects the set of possible target values from multiple sets of possible target values based on the cost;
        determines whether the predicted operating parameter for the selected set satisfies a constraint; and
        sets target values to the possible target values of the selected set when the predicted operating parameter satisfies the constraint; and
    an actuator module that controls the actuator of the engine based on at least one of the target values.

2. The system of claim 1 wherein the MPC module:
    predicts a level of combustion noise for the set of possible target values; and
    determines the cost for the set of possible target values based on the predicted combustion noise level.

3. The system of claim 1 wherein the predicted operating parameter includes a level of nitrogen oxide in exhaust gas produced by the engine.

4. The system of claim 1 wherein the predicted operating parameter includes a level of soot in exhaust gas produced by the engine.

5. The system of claim 1 wherein the predicted operating parameter includes an amount of soot buildup in a particulate filter of the exhaust system.

6. The system of claim 1 wherein the predicted operating parameter includes a level of ammonia stored in a selective catalytic reduction (SCR) catalyst of the exhaust system.

7. The system of claim 1 wherein the predicted operating parameter includes a temperature of a selective catalytic reduction (SCR) catalyst in the exhaust system.

8. The system of claim 1 wherein the predicted operating parameter includes a temperature of a particulate filter in the exhaust system.

9. The system of claim 1 wherein the predicted operating parameter further includes a speed of a vehicle that is propelled by the engine.

10. The system of claim 1 wherein the predicted operating parameter further includes a jerk of a vehicle that is propelled by the engine.

11. A method comprising:
    generating a set of possible target values for an actuator of an engine;
    predicting an operating parameter for the set of possible target values, wherein the predicted operating parameter includes at least one of an emission level and an operating parameter of an exhaust system;
    determining a cost for the set of possible target values, wherein the cost is a value that represents a loss of engine performance;
    selecting the set of possible target values from multiple sets of possible target values based on the cost;
    determining whether the predicted operating parameter for the selected set satisfies a constraint;
    setting target values to the possible target values of the selected set when the predicted operating parameter satisfies the constraint; and
    controlling the actuator of the engine based on at least one of the target values.

12. The method of claim 11 further comprising:
    predicting a level of combustion noise for the set of possible target values; and
    determining the cost for the set of possible target values based on the predicted combustion noise level.

13. The method of claim 11 wherein the predicted operating parameter includes a level of nitrogen oxide in exhaust gas produced by the engine.

14. The method of claim 11 wherein the predicted operating parameter includes a level of soot in exhaust gas produced by the engine.

15. The method of claim 11 wherein the predicted operating parameter includes an amount of soot buildup in a particulate filter of the exhaust system.

16. The method of claim 11 wherein the predicted operating parameter includes a level of ammonia stored in a selective catalytic reduction (SCR) catalyst of the exhaust system.

17. The method of claim 11 wherein the predicted operating parameter includes a temperature of a selective catalytic reduction (SCR) catalyst in the exhaust system.

18. The method of claim 11 wherein the predicted operating parameter includes a temperature of a particulate filter in the exhaust system.

19. The method of claim 11 wherein the predicted operating parameter further includes a speed of a vehicle that is propelled by the engine.

20. The method of claim 11 wherein the predicted operating parameter further includes a jerk of a vehicle that is propelled by the engine.

* * * * *